United States Patent [19]

Ruff

[11] Patent Number: 5,123,948
[45] Date of Patent: * Jun. 23, 1992

[54] ICEMAKER/WATER PURIFIER WITH BY-PASS CONDENSER

[75] Inventor: John D. Ruff, Alexandria, Va.

[73] Assignee: Thermadyne, Inc., Alexandria, Va.

[*] Notice: The portion of the term of this patent subsequent to Mar. 12, 2008 has been disclaimed.

[21] Appl. No.: 654,509

[22] Filed: Feb. 13, 1991

Related U.S. Application Data

[63] Continuation-in-part of Ser. No. 494,546, Mar. 16, 1990, Pat. No. 4,998,417, which is a continuation of Ser. No. 437,161, Nov. 16, 1989, Pat. No. 4,941,902.

[51] Int. Cl.$^5$ .............................................. C02F 1/22
[52] U.S. Cl. ........................................ 62/532; 62/124
[58] Field of Search .................. 62/123, 124, 238.6, 62/532

[56] References Cited

U.S. PATENT DOCUMENTS

| | | | |
|---|---|---|---|
| 3,926,008 | 12/1975 | Webber | 62/238.6 X |
| 4,262,489 | 4/1981 | Sakamoto | 62/124 |
| 4,998,417 | 3/1991 | Ruff | 62/532 |

Primary Examiner—William E. Tapolcai
Attorney, Agent, or Firm—Epstein Edell & Retzer

[57] ABSTRACT

A refrigeration system is employed alternatively as an automatic ice-maker, and a device to automatically produce a supply of purified water by melting a portion of the ice produced in the ice-making operation. Separate sections of the condenser of the refrigeration system are selectively employed to provide heat to melt ice when the purified water supply is low and, alternatively, to reject heat when the purified water supply is sufficient but ice production is required.

2 Claims, 2 Drawing Sheets

ICEMAKER/WATER PURIFIER WITH BY-PASS CONDENSER

CROSS-REFERENCE TO RELATED APPLICATIONS

This application is a continuation-in-part of my co-pending U.S. patent application Ser. No. 07/494,546 filed Mar. 16, 1990, now U.S. Pat. No. 4,998,417, which is a continuation-in-part of my prior U.S. patent application Ser. No. 07/437,161, filed Nov. 16, 1989, now U.S. Pat. No. 4,941,902.

Another related application is my co-pending U.S. patent application, Ser. No. 07/471,885, now U.S. Pat. No. 5,013,344.

The subject matter of all three of the aforesaid applications is expressly incorporated herein in its entirety.

BACKGROUND OF THE INVENTION

The present invention relates to a method and apparatus for providing purified ice pieces and purified liquid water from a source of unpurified liquid water. More particularly, the present invention provides an alternative approach to melting ice pieces in a method and apparatus of the type generally disclosed in my aforementioned U.S. patent application Ser. No. 07/494,546.

In my U.S. patent application Ser. No. 07/494,546, I disclose a method and apparatus for forming purified ice pieces from unpurified water, such as tap water. The ice pieces are periodically harvested and collected in a bin, the bottom of which is heated as necessary to melt desired quantities of the ice to provide a supply of purified water. In the embodiment disclosure in FIG. 1 of my aforementioned patent, heat for melting the ice is derived from an alternative ice-melting condenser connected in the refrigerant flow path and disposed near the bottom of the ice bin. Solenoid valves are employed to direct the refrigerant vapor flow to this alternative ice-melting condenser, or to a separate non-melting condenser, thus selectively engaging alternatively, a melting or a non-melting operation.

In the present invention, while in an ice-melting operation, refrigerant vapor flows directly through the non-melting and ice-melting condensers in a series flow path. In the non-melting operation, vapor flows through the non-melting condenser only, and the melting condenser is bypassed.

OBJECTS AND SUMMARY OF THE INVENTION

It is an object of the present invention to provide an alternative method and apparatus to that disclosed in my U.S. patent application Ser. No. 07/494,546, for applying thermal energy to a collection bin for purified ice, thereby melting some of the ice to provide and collect purified water.

In accordance with the present invention, when the system is in an ice melting operation, refrigerant vapor discharged from the system compressor passes through the warmer non-melting condenser without condensing. This vapor then flows into the colder ice-melting condenser where it condenses, and is returned in liquid form back to the evaporator.

In the non-melting operation, the refrigerant vapor flows into the non-melting condenser, where condensing occurs. The condensed liquid is bypassed directly back to the evaporator. Solenoid valves are employed to shut off flow to the ice-melting condenser and to bypass liquid refrigerant flow back to the evaporator.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference numerals, and wherein.

DESCRIPTION OF THE PREFERRED EMBODIMENTS

Figure 1:
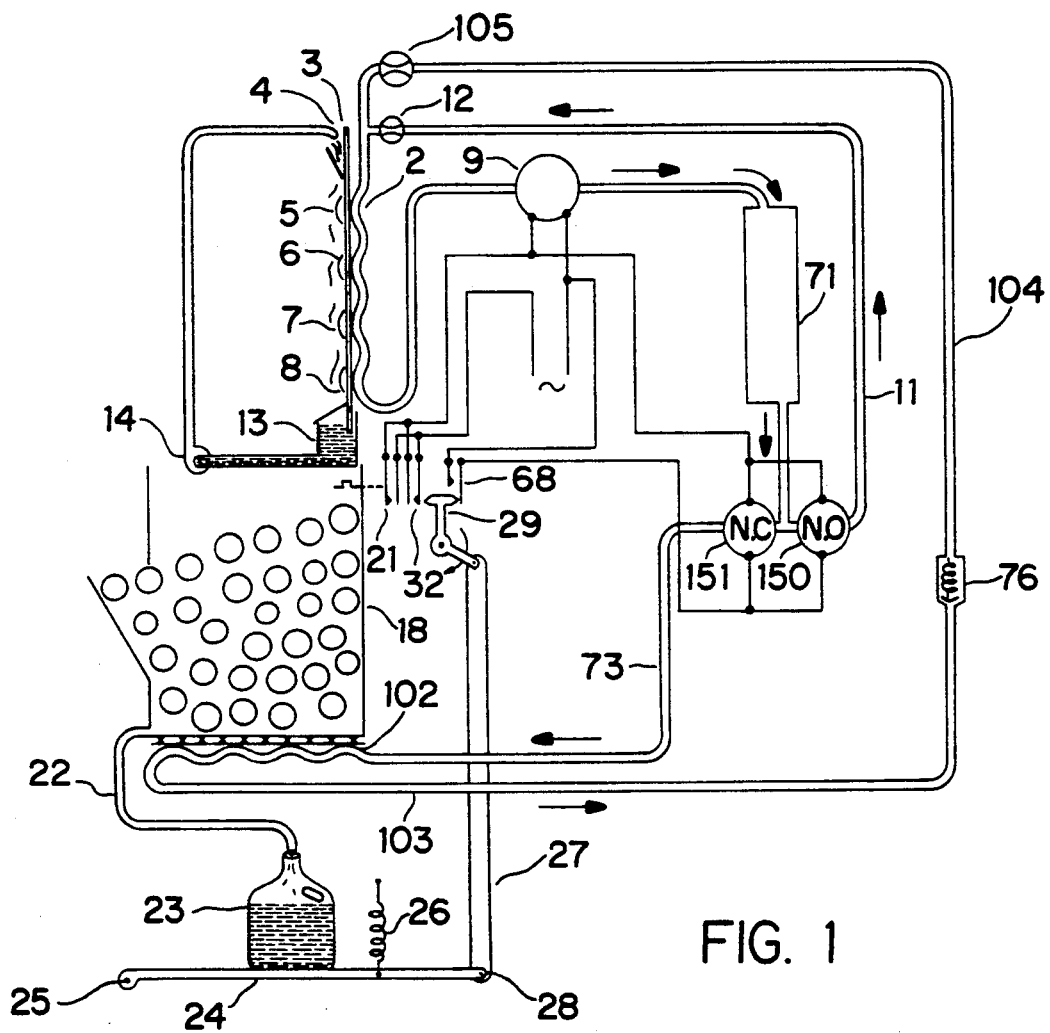
FIG. 1 is a schematic flow diagram of a system constituting one embodiment of the present invention.

In order to facilitate reference to the disclosure material incorporated herein from my U.S. patent application Ser. No. 07/494,546, reference numerals up to and including 106 appearing in the accompanying drawings are chosen to correspond to those reference numerals employed in the aforesaid patent for like elements. Higher reference numerals appearing in the accompanying drawings designate elements not present in the aforesaid patent. In the interest of brevity, and to facilitate understanding of the subject matter of the present invention, the following description omits discussion of the portions of the system not directly related to the invention subject matter.

Referring now to FIG. 1 of the accompanying drawings, an ice maker includes an evaporator tube 2 contacting the dry or control surface of a vertical ice-forming plate 3 at multiple spaced locations. For some applications a plurality of such plates may be employed. Unpurified water discharged as a jet or stream from nozzle 4 flows down along the wet or ice-forming surface of plate 3, whereby ice pieces 5, 6, 7 and 8 are formed at the spaced areas corresponding to the locations of contact between evaporator tube 2 and plate 3. Refrigerant vapor from evaporator 2 flows back to a compressor 9 where it is compressed and then directed to a condensing system described in detail below. Liquid refrigerant returning from the condensing system is conveyed by liquid line 11 to a metering device 12, typically an expansion valve, and then back to evaporator 2 in a conventional closed circuit refrigeration flow path. Excess water flowing over the growing ice pieces 5, 6, 7 and 8 carries away impurities before they can be trapped and then drains into sump 13. Water from sump 13 is drawn by pump 14 and pumped back to nozzle 4 to form a continuous circuit of unpurified water flow.

After a predetermined time has elapsed for ice pieces 5, 6, 7 and 8 to grow to adequate size, a harvest of the ice pieces is initiated. A repetitive cycle of harvest and ice making is thus continued until ice collection bin 18 is full, at which time the ice pieces come into contact with the ice quantity sensor of bin switch 21 which opens to cause compressor 9 to be deactuated.

Any ice that melts in bin 18 drains through a pipe 22 having an inlet at the bottom of the bin. The drained water flows into a bottle 23 or other container resting on a platform 24 hinged at a positionally fixed point 25. By "positionally fixed" it is meant that the hinge or pivot point 25 is stationary relative to the common cabinet or housing for all of the components described herein. With container 23 full, its weight overcomes the resilient bias force of a balance spring 26 and pulls platform 24 clockwise (as viewed in the drawing) to swing the platform downward. This downward movement causes a downward movement of a control link 27 connected to platform 24 at a connecting pivot 28, the latter being movable relative to the common system housing. The opposite end of control link 27 is attached to a movable pivot point 31 which is attached to rocker arm 29. Downward movement of control link 27 causes clockwise rotation of rocker arm 29 about a positionally fixed pivot point 30. This clockwise rotation of rocker arm 29 holds switch 68 open. Electrical current flow to solenoid valves 150 and 151 is thus interrupted so that these valves remain deenergized. With bin switch 21 closed, indicating that the bin is less than full of ice pieces, compressor 9 continues to run and to discharge refrigerant vapor into condenser 71 where it condenses into a liquid. Since the de-energized solenoid valve 150 is a normally open valve, it allows a flow of the condensed liquid to travel through liquid line 11 to metering device 12, and then to evaporator 2 in the ice-making function previously described. Condenser 71 may be either air-cooled or water-cooled. Since the de-energized solenoid valve 151 is a normally closed valve, it prevents any refrigerant flow to condenser coil 102, and thus prevents an ice-melting function at this time. Check valve 76 prevents any backflow into condenser coil 102, from evaporator 2, through metering device 105.

If bottle 23 is less than full, its weight is overcome by the resilient bias force of balance spring 26 which pulls platform 24 counter-clockwise (as viewed in the drawing) to swing the platform upwardly. Upward movement of the platform causes an upward movement of control link 27 and a counter clockwise rotation of rocker arm 29. In response to rotation of rocker arm 29, an override switch 32 closes, thereby bypassing bin switch 21 to permit compressor 9 to run regardless of the state of the bin switch. Counter-clockwise rotation of rocker arm 29 also permits switch 68 to close, thereby completing a circuit to energize both solenoid valves 150 and 151. When the normally open solenoid valve 150 is energized, it closes to shut off refrigerant bypass flow to liquid line 11. When the normally closed solenoid valve 151 is energized, it opens to allow flow of compressed refrigerant vapor through pipe 73 to condenser coil 102 secured in direct contact with the bottom of ice collection bin 18. In this manner an ice-melting function is initiated. Compressor 9 discharges compressed vapor through condenser 71, then through the open solenoid valve 151 to condenser coil 102, where condensing will occur since condenser coil 102 is colder than condenser 71. This cooler condensing temperature creates a pressure in condenser 71 low enough to place the vapor passing through it in a super-heated condition, thus inhibiting condensing in condenser 71. The temperature of condenser 71 is at least ambient temperature. As already mentioned, condenser coil 102 is in direct contact with the bottom of bin 18 so that the condensing temperature will be close to 32°; however, alternatively, by the use of techniques shown in my aforementioned U.S. Pat. No. 4,941,902 and co-pending U.S. patent application 07/471,885, a somewhat higher condensing temperature can be maintained in condenser coil 102. These techniques employ methods of restricting the flow of heat from a condenser such as condenser coil 102, mounted at the bottom of the ice bin to melt ice in the ice bin, and causing higher condensing temperatures in such a condenser by flooding or undersizing. Even though the condensing temperature can be usefully maintained at a somewhat higher level by these techniques, the condensing temperature in condenser coil 102 must still be maintained somewhat lower than the temperature of condenser 71 to prevent condensing therein, during the melting function. Condenser coil 102 will always be associated with a cooler environment than condenser 71, and thus will act as a condenser whenever vapor is passing through it. For this reason, condenser coil 102 must always be the second condenser when a flow of vapor is passing through both condensers in a series arrangement, so that condenser coil 102 can be bypassed when it is required there be no condensing in it. Condenser coil 102 thus acts as a condenser rejecting heat of condensation to melt ice pieces in bin 18. Ice resting at the bottom of bin 18 is thereby melted at a relatively fast rate, and the resulting purified water is drained by a pipe 22 into container 23.

As ice melts at the bottom of bin 18, the weight of ice pieces in the bin causes more pieces to continually move downwardly to the bin bottom. Meanwhile, the ice-making function continues so that a supply of fresh ice pieces is collected in the bin. Condensed liquid refrigerant from condenser coil 102 flows through pipe 103 and check valve 76 to liquid line 104. Check valve 76 also serves to block backflow into condenser coil 102 during system shut down. Liquid refrigerant flows in liquid line 104 to a second metering device 105, and then back to evaporator 2 in a continuous refrigeration circuit. Solenoid valve 150 remains closed and prevents bypassing through liquid line 11. Metering device 105 can be an expansion valve, capillary tube, or other type of throttling device, but it differs from metering device 12 in that its orifice, through which the liquid refrigerant passes, must be much larger or, in the case of an expansion valve, capable of opening to a much larger opening than provided in metering device 12. This is required because, when condenser coil 102 is functioning as the system condenser, the high-side pressure is quite low due to a low condensing temperature as compared to the higher pressure and temperature in condenser 71. Accordingly, with only the lower pressure available to propel refrigerant liquid through the metering device, the orifice or opening must be much larger if the same flow rate to the evaporator is to be maintained.

When water container 23 becomes full, its weight once again overcomes the bias force of balance spring 26, causing platform 24 to drop (i.e., pivot clockwise about fixed pivot 25). Control link 27 is thereby pulled downwardly, rotating rocker arm 29 clockwise to open switch 68 and de-energize solenoid valves 150, and 151 and terminating the ice-melting function. Override switch 32 also opens, leaving control of the ice making function to bin switch 21.

Figure 2:
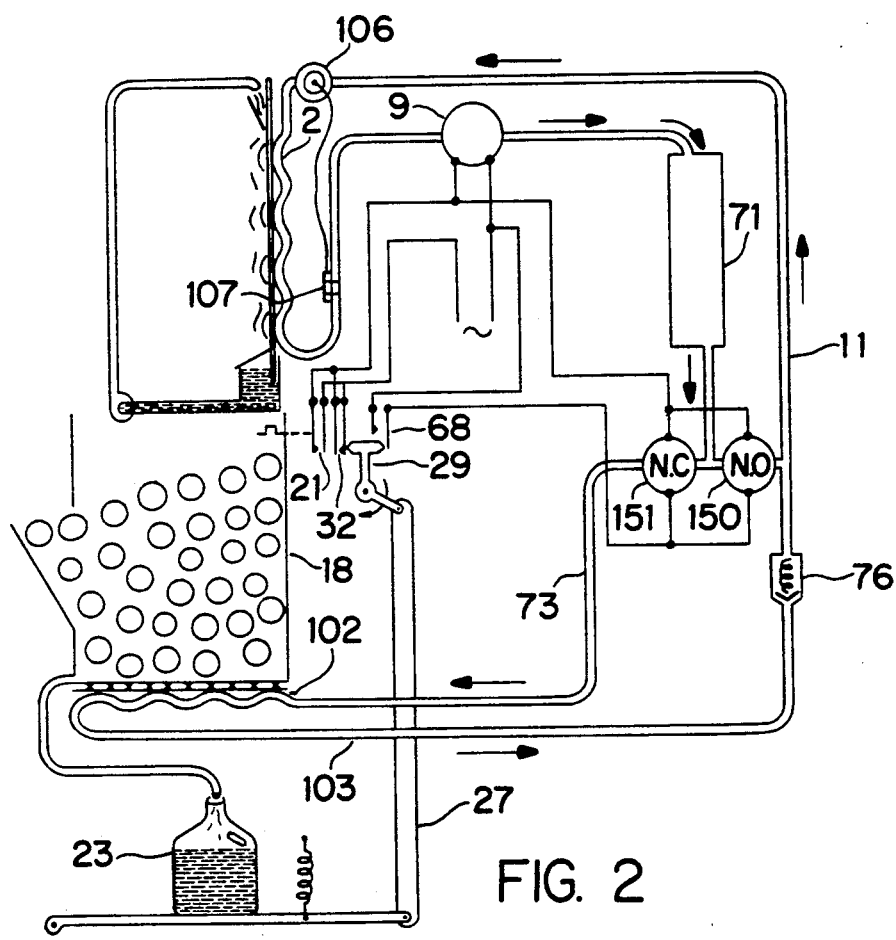
FIG. 2 is a schematic flow diagram of a second embodiment of the system of the present invention.

Another embodiment of the invention is illustrated in FIG. 2 of the accompanying drawings to which reference is now made. The overall operation of this embodiment is identical to that described for the embodiment illustrated in FIG. 1 except that a single liquid line 11 and a single expansion valve 106 are employed rather than the two metering devices 12 and 105 and their associated liquid lines 11 and 104 (FIG. 1). Expansion valve 106 is capable of controlling a relatively constant flow of refrigerant liquid, regardless of a wide range of pressure differentials encountered between the high-side and the low-side pressures, when condenser coil 102 or condenser 71 are used alternatively as described above in connection with the embodiment illustrated in FIG. 1. Expansion valve 106 is a wide-range thermostatic expansion valve of the type described in detail in my co-pending U.S. patent application Ser. No. 07/494,546.

An alternative embodiment for expansion valve 106 is a conventional electrical expansion valve. Such valves are motorized metering devices with refrigerant liquid flow controlled by an electronic microprocessor responsive to sensors monitoring system conditions. Such devices are well known.

In the ice-making, non-melting mode of operation of the system illustrated in FIG. 2, refrigerant vapor from evaporator tube 2 is drawn by compressor 9, compressed and then discharged to condenser 71. Condensed liquid refrigerant flows through solenoid valve 150, through liquid line 11, and then through expansion valve 106 to evaporator tube 2 in a conventional refrigeration cycle. Closed solenoid valve 151, and check valve 76 prevent refrigerant flow to condenser coil 102. As described above, the differential between the pressures in liquid line 11 and evaporator tube 2 is relatively large when condenser 71 is in operation. When the system is switched to an ice-making, ice-melting mode of operation, compressor 9 discharges the compressed vapor through condenser 71, solenoid valve 151, and pipe 73 to condenser coil 102, as already described in the embodiment illustrated in FIG. 1. Condensed liquid refrigerant flows through pipe 103, check valve 76, liquid line 11 and expansion valve 106 to evaporator tube 2. The differential between the pressures in liquid line 11 and evaporator 2 is relatively small when condensing occurs at the lower temperature of condenser coil 102 (as previously described). Regardless of these disparate pressure differentials, expansion valve 106 allows only the appropriate amount of liquid refrigerant to flow into evaporator tube 2 in these alternative melting and non-melting modes of operation. Temperature bulb 107 senses the temperature of suction vapor leaving the evaporator 2. Solenoid valve 150 is closed and prevents bypassing from condenser 71 to liquid line 11.

Having described preferred embodiments of a new and improved ice maker system with wide range condensing temperatures, constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. In a system for providing purified ice pieces from a source of unpurified water, collecting the ice pieces in a bin, and providing purified liquid water by selectively melting some of the ice pieces, wherein ice is formed with the aid of evaporator means in a continuous flow path for refrigerant fluid, the flow path additionally including a compressor, condenser means and metering means for delivering refrigeration fluid to the evaporator means, a method for melting some of said ice pieces comprising the steps of:

(a) sub-dividing said condenser means into first and second alternatively actuable effective condenser sections in said refrigerant flow path;
(b) actuating said second condenser section in an ice-making, ice-melting mode of system operation, and actuating said first condenser section in an ice-making, non melting mode of system operation;
(c) maintaining a relatively low condensing temperature in said second condenser section while utilizing the rejected heat from said second condenser section to melt ice in said bin at a temperature of approximately 32° F.;
(d) maintaining a condensing temperature in said first condenser section, relatively higher than the condensing temperature in said second condenser section while disbursing rejected heat from said first condenser section; and
(e) collecting in a container said purified liquid water obtained by melting some of said ice pieces in step (c);
(f) sensing the amount of collected ice in said bin;
(g) sensing the amount of collected liquid water in said container;
(h) in response to both the amount of said collected ice in said bin exceeding a first predetermined amount, and the amount of said collected purified liquid water in said container exceeding a second predetermined amount, de-energizing said compressor;
(i) following step (h), re-energizing said compressor whenever either or both of the following occurs: (1) the amount of collected ice in said bin falls below the first predetermined amount; and (2) the amount of collected purified liquid water in said container falls below the second predetermined amount;

and wherein step (i) includes the steps of:

(i.1) in response to the amount of collected purified liquid water in said container being less than said second predetermined amount, actuating said second condenser section; and
(i.2) in response to the amount of collected purified liquid water in said container exceeding said second predetermined amount, actuating said first condenser section.

2. In a system for providing purified ice pieces from a source of unpurified water, collecting the ice pieces in a bin, and providing purified liquid water by selectively melting some of the ice pieces in said bin, and wherein the ice is formed with the aid of an evaporator disposed in a continuous flow path for refrigerant fluid, the flow path additionally including a compressor, condenser means and metering means for delivering refrigerant fluid to said evaporator means, the improvement comprising:

first and second condenser sections corresponding to said condenser means;
means for selectively and alternatively actuating said first and second condenser sections in respective non-melting and ice-melting modes of operation;
means for utilizing rejected heat from said second condenser section to melt ice in said bin at a temperature of approximately 32° F.;
means for maintaining condensing temperatures and pressures in said first condenser section higher than the condensing temperatures and pressures in said second condenser section;
container means for collecting the purified liquid water formed by melting the ice in said bin;
bin sensor means for sensing the amount of ice collected in said bin;
container sensor means for sensing the amount of purified liquid water collected in said container;

control means responsive to both said bin sensor means and said container sensor means for de-energizing said compressor when the amount of said collected ice in said bin exceeds a first predetermined amount and the amount of said collected purified liquid water in said container exceeds a second predetermined amount, said control means further including means for reenergizing said compressor in response to either or both of the following conditions: (1) the amount of collected ice in said bin falling below the first predetermined amount; and (2) the amount of collected purified liquid water in said container falling below the second predetermined amount;

wherein said control means further includes:
control means responsive to the amount of collected purified liquid in said container being less than said second predetermined amount for actuating said second condenser section and;
control means responsive to the amount of collected purified liquid in said container exceeding said second predetermined amount for actuating said first condenser section.

* * * * *